(12) United States Patent
Stacey, Jr. et al.

(10) Patent No.: US 10,067,949 B1
(45) Date of Patent: Sep. 4, 2018

(54) ACQUIRED NAMESPACE METADATA SERVICE FOR CONTROLLING ACCESS TO DISTRIBUTED FILE SYSTEM

(71) Applicant: EMC Corporation, Hopkinton, MA (US)

(72) Inventors: Chris Stacey, Jr., Christchurch (NZ); John Cardente, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 155 days.

(21) Appl. No.: 14/139,011

(22) Filed: Dec. 23, 2013

(51) Int. Cl.
   *G06F 17/30* (2006.01)

(52) U.S. Cl.
   CPC .............................. *G06F 17/30194* (2013.01)

(58) Field of Classification Search
   CPC .............................................. G06F 17/30194
   See application file for complete search history.

(56) References Cited

U.S. PATENT DOCUMENTS

| | | | | |
|---|---|---|---|---|
| 6,625,604 B2 * | 9/2003 | Muntz | ............... | G06F 17/30067 |
| 6,697,846 B1 * | 2/2004 | Soltis | ............... | G06F 17/30194 |
| | | | | 707/999.001 |
| 7,330,957 B2 * | 2/2008 | Miyazaki | ............... | G06F 3/0605 |
| | | | | 711/170 |
| 7,653,699 B1 * | 1/2010 | Colgrove | .......... | G06F 17/30067 |
| | | | | 709/213 |
| 8,086,638 B1 * | 12/2011 | Stacey | ............. | G06F 17/30079 |
| | | | | 707/791 |
| 2004/0122917 A1 * | 6/2004 | Menon | .............. | G06F 17/30194 |
| | | | | 707/E17.032 |
| 2005/0066160 A1 * | 3/2005 | Parham | .............. | G06Q 20/3674 |
| | | | | 713/155 |
| 2005/0114291 A1 * | 5/2005 | Becker-Szendy | ........................ | |
| | | | | G06F 17/30067 |
| 2007/0198458 A1 | 8/2007 | Pudipeddi | | |
| 2009/0006500 A1 * | 1/2009 | Shiozawa | ......... | G06F 17/30221 |
| 2009/0106255 A1 * | 4/2009 | Lacapra | .............. | G06F 11/1076 |
| 2010/0114889 A1 * | 5/2010 | Rabii | ................ | G06F 17/30197 |
| | | | | 707/E17.032 |

(Continued)

OTHER PUBLICATIONS

"What is the Hadoop Distributed File System (HDFS)?", Apr. 17, 2012, International Business Machines Corporation.*

*Primary Examiner* — Ashish Thomas
*Assistant Examiner* — Jedidiah P Ferrer
(74) *Attorney, Agent, or Firm* — Ryan, Mason & Lewis, LLP

(57) ABSTRACT

Systems and methods are provided for adopting and controlling storage resources of a distributed file system using an acquired namespace metadata service. For example, a computing system includes a first file system, and a distributed file system, which is separate from the first file system. The distributed file system includes storage nodes for storing data. The first file system includes an acquired namespace metadata server that is configured to execute on one or more nodes of the first file system. To adopt and control storage resources of the distributed file system, the first file system acquires a namespace of the distributed file system and uses the acquired namespace metadata server to manage the acquired namespace of the distributed file system. Moreover, the first file system uses the acquired namespace metadata server to directly communicate with and control access to the storage nodes of the distributed file system.

20 Claims, 5 Drawing Sheets

(56) References Cited

U.S. PATENT DOCUMENTS

| | | |
|---|---|---|
| 2011/0088040 A1 | 4/2011 | Sheehan |
| 2011/0106802 A1 | 5/2011 | Pinkney et al. |
| 2011/0231524 A1 | 9/2011 | Lin et al. |
| 2012/0059989 A1 | 3/2012 | Hamaguchi |
| 2012/0290630 A1 | 11/2012 | Aizman et al. |
| 2013/0290470 A1 | 10/2013 | CaraDonna et al. |
| 2015/0067002 A1* | 3/2015 | Shvachko ......... G06F 17/30215 707/827 |

* cited by examiner

ACQUIRED NAMESPACE METADATA SERVICE FOR CONTROLLING ACCESS TO DISTRIBUTED FILE SYSTEM

FIELD

The field relates generally to data storage systems and, more particularly, to systems and methods for adopting and controlling storage resources of a distributed file system using an acquired namespace metadata service.

BACKGROUND

In general, distributed file systems are designed to store large amounts of data and provide various client access to the stored data distributed across a network. One well-known distributed file system is the Hadoop Distributed File System (HDFS). HDFS is a distributed file system that is structured to store very large amounts of data (terabytes or petabytes), and provide high-throughput access to the stored data. In an HDFS storage system, files are stored in a redundant fashion across multiple server nodes to ensure durability to failure and to ensure availability for highly parallel applications.

In a current state of the art implementation of HDFS, data that is accessed by an HDFS client is stored across a network of distributed data stores that are managed by corresponding data node servers and accessed via an HDFS protocol. The HDFS protocol utilizes a namenode function (or namenode server) to manage a namespace of the HDFS data stores. Compute nodes consult the namenode server to determine where to read/write data from/to. One version of the HDFS protocol, version 1, supports only one set of HDFS data stores per compute cluster because it supports only one namespace. Another version of the HDFS protocol, version 2, supports multiple HDFS namespaces per cluster and federation, which allows compute nodes to navigate to all namespaces and corresponding data stores. There are some limitations with the current HDFS protocols.

For example, if a Hadoop compute cluster uses HDFS, v1, additional data stores cannot be added to the original data stores of the compute cluster when the original data stores run out of storage space, i.e., the original cluster of data stores cannot be expanded. Not only does this restrict expansion of the HDFS system, it also means that an original data store must be abandoned if a second HDFS data store must be used. This circumstance arises, for example, when a customer deploys a Hadoop cluster with an internal data store on internal disk and later wants to use an external data store on a cluster file system. The only option is to abandon the existing data store and start using the new data store, which is disruptive and time consuming as large amounts of data must be transferred. Further, even if a customer is using HDFS v2 which supports the simultaneous use of multiple HDFS stores, there is no efficient way to balance and tier the data between the different stores to optimize performance and/or capacity utilization, and data protection.

SUMMARY

Illustrative embodiments of the present invention generally include systems and methods for adopting and controlling storage resources of a distributed file system using an acquired namespace metadata service. For example, in one embodiment of the invention, a computing system includes a first file system, and a distributed file system, which is separate from the first file system. The distributed file system includes storage nodes for storing data. The first file system includes an acquired namespace metadata server that is configured to execute on one or more nodes of the first file system. To adopt and control storage resources of the distributed file system, the first file system acquires a namespace of the distributed file system and uses the acquired namespace metadata server to manage the acquired namespace of the distributed file system. Moreover, the first file system uses the acquired namespace metadata server to directly communicate with and control access to the storage nodes of the distributed file system.

In other embodiments of the invention, the acquired namespace metadata server can add storage resources of the first file system to the namespace acquired from the distributed file system, or add a representation of one or more objects from a namespace of the first file system to the acquired namespace of the distributed file system, or merge a namespace of the first file system with the acquired namespace of the distributed file system to generate a merged namespace. The first file system uses the acquired namespace metadata server and the acquired namespace of the distributed file system to transparently migrate data between the storage nodes of the distributed file system and storage resources of the first file system.

These and other embodiments of the invention will be described in further detail in the following detailed description of illustrative embodiments, which is to be read in conjunction with the accompanying drawings.

DETAILED DESCRIPTION

Embodiments of the invention will now be discussed in further detail with regard to data storage systems and methods for adopting and controlling storage resources of a distributed file system using an acquired namespace metadata service. While illustrative embodiments of the present invention will be described herein with reference to exemplary cluster file systems, distributed file systems, and associated clients, servers, storage arrays and other processing devices, it is to be appreciated that the invention is not restricted to use with the particular illustrative file system and system/device configurations as specifically shown in the accompanying figures.

Figure 1:
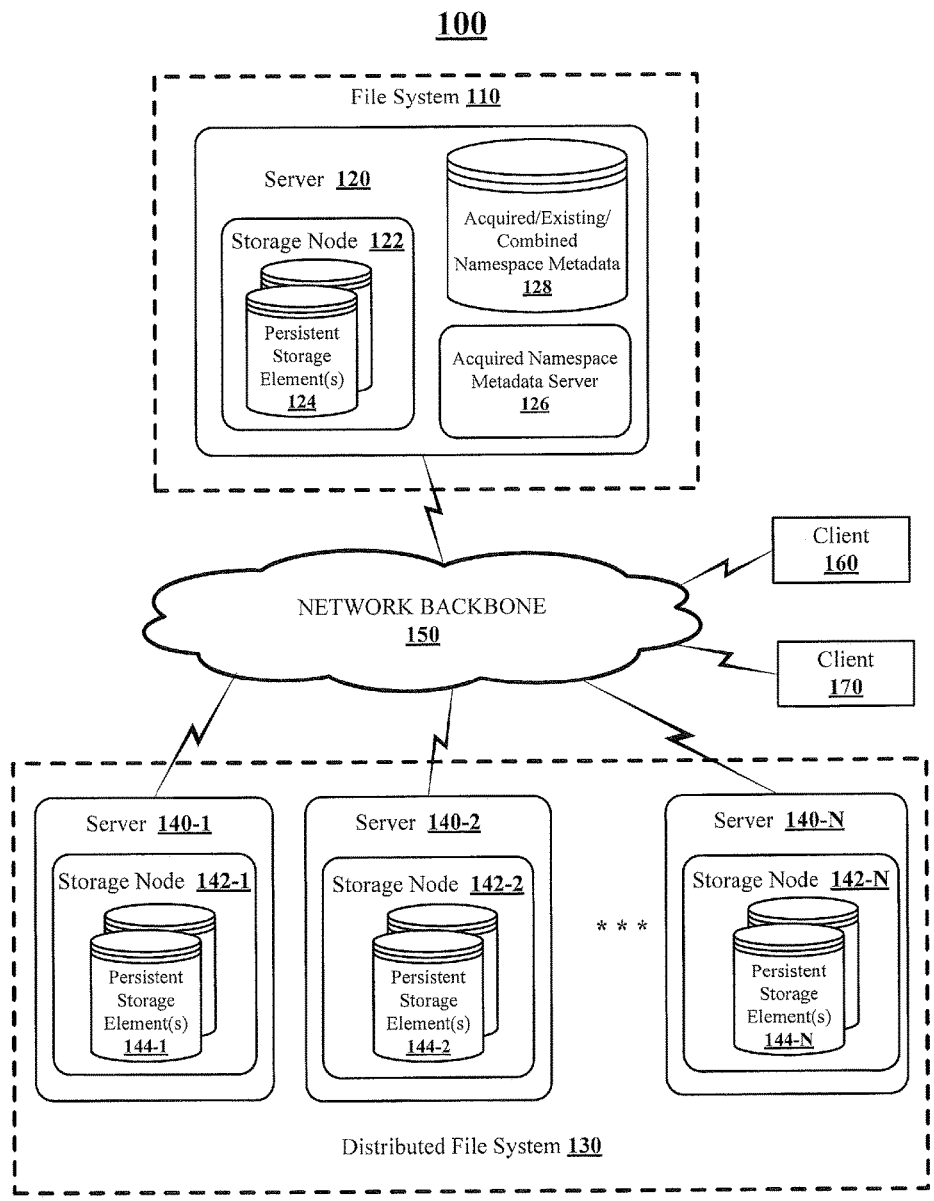
FIG. 1 is a block diagram of a data storage system in which an adopting file system assumes control over and manages an adopted file system, according to an embodiment of the invention.

FIG. 1 is a block diagram of a data storage system in which an adopting file system assumes control over and manages an adopted file system, according to an embodiment of the invention. In general, FIG. 1 illustrates a data storage system 100 comprising a first file system 110 (alternatively referred to as an "adopting file system") and a distributed file system 130 (alternatively referred to as an "adopted file system"). The adopting file system 110 comprises at least one server node 120. The server node 120 comprises a storage node 122 that executes on the server node 120 to manage and control one or more persistent storage elements 124 associated therewith. The server node 120 further comprises an acquired namespace metadata server 126 that executes on the server node 120, and a database of namespace metadata 128 that resides on the server node 120.

Further, the adopted file system 130 comprises a plurality (N) of server nodes 140-1, 140-2, . . . , 140-N. The server nodes 140-1, 140-2, . . . , 140-N comprises respective storage nodes 142-1, 142-2, . . . , 142-N which execute on the respective server nodes to manage and control respective persistent storage elements 144-1, 144-2, . . . , 144-N. The adopting file system 110 and adopted file system 130 communicate over a network 150, with various clients 160, 170 accessing the storage resources of the file systems 110 and 130 via the network 150. The network 150 may comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed to encompass a wide variety of different network arrangements, including combinations of multiple networks possibly of different types.

In the data storage system 100 of FIG. 1, the storage nodes 122 and 142-1, 142-2, . . . , 142-N are computer programs that are executed on the respective sever nodes to manage local file systems and control access to data stored in the persistent storage elements 124 and 144-1, 144-2, . . . , 144-N. The persistent storage elements 124 and 144-1, 144-2, . . . , 144-N can be implemented using one or more different types of persistent storage devices such as flash storage devices, or disk storage devices, for example. The flash storage devices may be implemented, by way of example, using respective flash Peripheral Component Interconnect Express (PCIe) cards or other types of memory cards installed in a computer or other processing device that implements the corresponding servers. Numerous alternative arrangements are possible. In addition, a variety of other types of non-volatile or volatile memory in any combination may be used in place of the flash storage devices. Examples of alternatives to flash storage devices that may be used as persistent storage elements in other embodiments of the invention include non-volatile memories such as magnetic random access memory (MRAM) and phase change random access memory (PC-RAM).

Furthermore, in the data storage system 100 of FIG. 1, the storage nodes 122 and 142-1, 142-2, . . . , 142-N, and associated persistent storage elements 124 and 144-1, 144-2, . . . , 144-N collectively comprise a pool of storage resources, which is controlled and managed by the acquired namespace metadata server 126 executing on the server node 120 of the adopting file system 110. The adopting file system 110 may be any type of file system including, for example, a single file server system, a distributed file system, or a clustered file system. The adopted file system 130 may be any type of distributed file system that operates with centralized control through a namespace metadata server (e.g., a namenode server in an HDFS data storage environment). Prior to being adopted, the distributed file system 130 comprises a namespace that is centrally managed by a namespace metadata server, as is known in the art. In the field of file server systems, a "namespace" refers to a scheme by which clients or compute nodes can navigate and access data of a storage system. Moreover, a "namespace metadata server" generally refers to a program that controls and manages a "namespace" of the file system, and maintains and controls metadata that defines the current state of the namespace.

To adopt and control storage resources of the distributed file system 130, the adopting file system 110 acquires a namespace of the distributed file system 130, and assumes control of the namespace of the distributed file system 130 using the acquired namespace metadata server 126 to manage the acquired namespace of the distributed file system 130. In this regard, the functionality of an existing namespace metadata server executing on a server node of the distributed file system 130 being adopted is essentially taken over by the adopting file system 110, whereby the existing namespace metadata server ceases to execute or exist in the distributed file system 130 being adopted. Moreover, the adopting file system 110 uses the acquired namespace metadata server 126 to directly communicate with and control access to the storage nodes 142-1, 142-2, . . . , 142-N of the adopted file system 130 using the acquired namespace metadata residing in the namespace metadata database 128.

In other embodiments of the invention, the acquired namespace metadata server 126 can add storage resources of the adopting file system 110 to the namespace acquired from the distributed file system 130, or add a representation of one or more objects from the existing namespace metadata of the adopting file system 110 to the acquired namespace metadata of the adopted file system 130, or merge/combine the existing namespace metadata of the adopting file system 110 with the acquired namespace metadata of the adopted file system 130 to generate a combined namespace that is controlled by the acquired namespace metadata server 126. In this regard, the adopting file system 110 can extend the acquired namespace in a plurality of ways to enable access to the storage resources and/or stored data of the adopting file system 110 and/or the adopted file system 130 by the various clients 160, 170 of the adopting file system 110 and the adopted file system 130 in a transparent manner. Systems and methods that enable one file system to assume control over and manage a namespace of another file system according to embodiments of the invention will be discussed now in further detail with reference to FIGS. 2A, 2B, 3, and the flow diagram of FIG. 4.

Figure 2A:
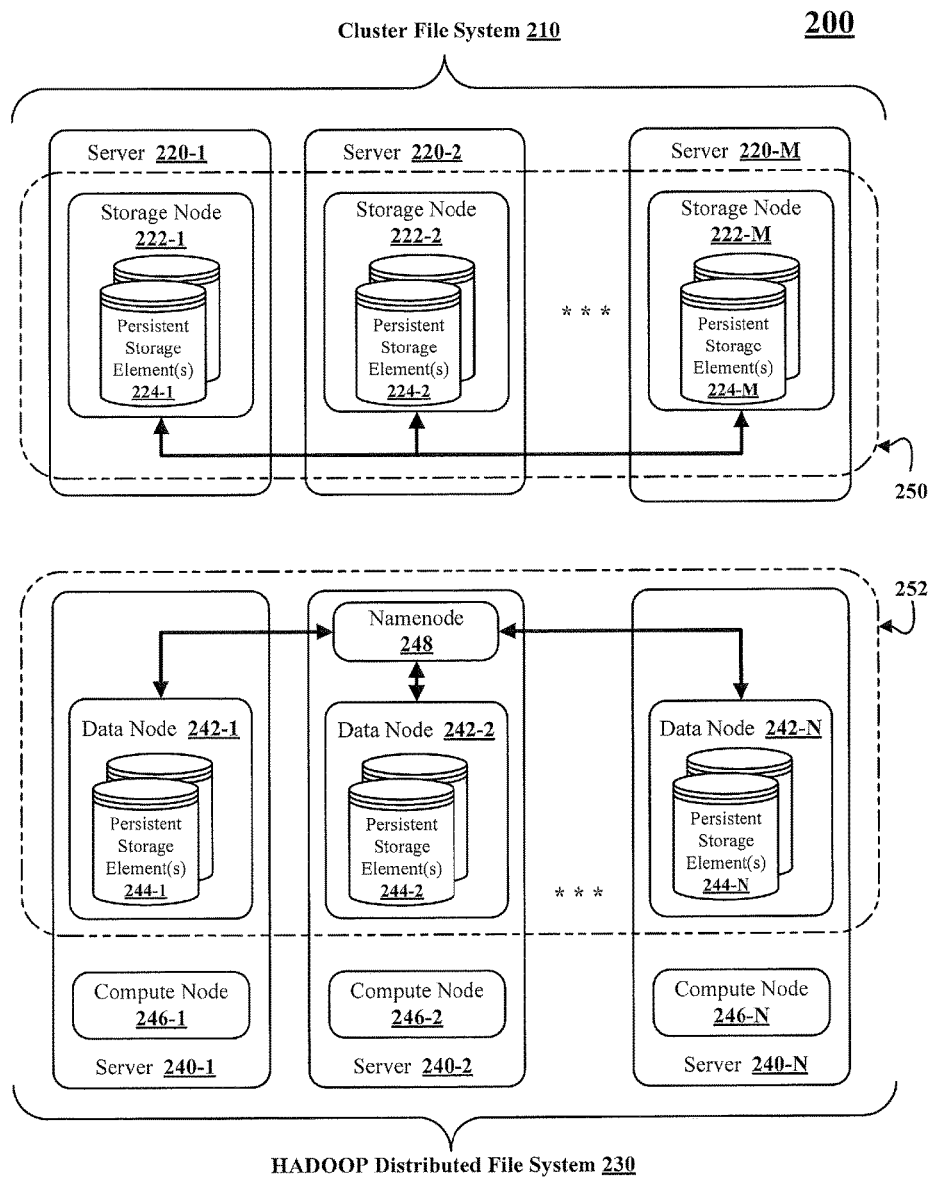
FIGS. 2A and 2B schematically illustrate a process of a cluster file system acquiring and assuming control of a namespace of a distributed file system, according to an embodiment of the invention.
Figure 2B:
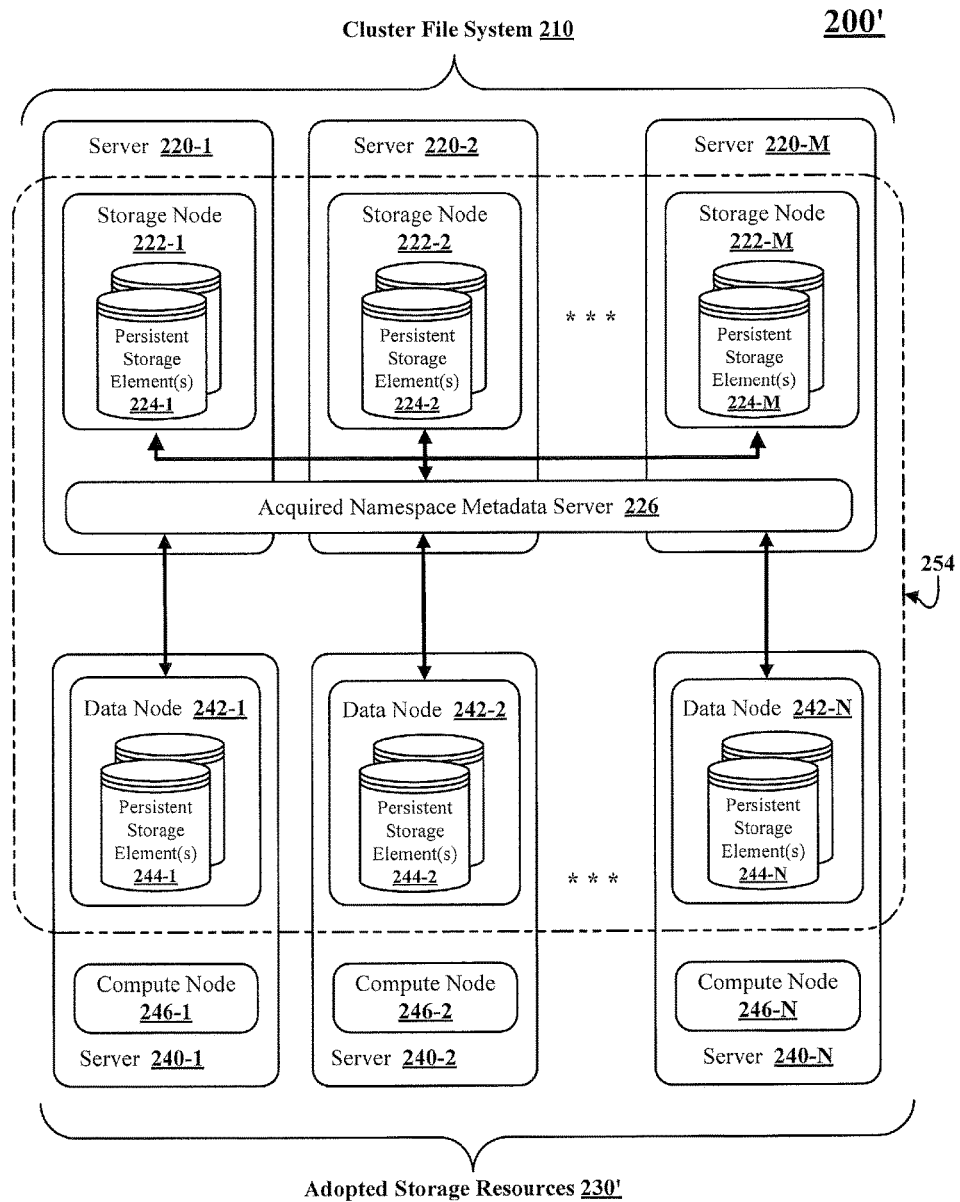

FIGS. 2A and 2B schematically illustrate a process of a cluster file system acquiring and assuming control of a namespace of a distributed file system, according to an embodiment of the invention. In general, FIG. 2A illustrates a data storage system 200 comprising two separate file systems, including a cluster file system 210 and a distributed file system 230. The cluster file system 210 comprises a plurality (M) of sever nodes 220-1, 220-2, . . . , 220-M, and the distributed file system 230 comprises a plurality (N) of server nodes 240-1, 240-2, . . . , 240-N.

In the cluster file system 210, the server nodes 220-1, 220-2, . . . , 220-M comprise respective storage nodes 222-1, 222-2, . . . , 222-M, which manage and control persistent storage elements 224-1, 224-2, . . . , 224-M, respectively, within the cluster file system 210. The persistent storage elements 224-1, 224-2, . . . , 224-M can be implemented using one or more different types of persistent storage devices such as flash storage devices, disk storage devices, and other types of non-volatile or volatile memory in any combination, as noted above. The storage nodes 222-1, 222-2, ..., 222-M, and respective persistent storage elements 224-1, 224-2, ..., 224-M collectively comprise a pool of storage resources 250 which is controlled and managed in a distributed fashion over the cluster of server nodes 220-1, 220-2, ..., 220-M of the cluster file system 210.

In general, the cluster file system 210 allows multiple client devices to share access to files over a network. The term "cluster file system" as used herein is intended to be broadly construed to encompass, for example, distributed file systems, parallel file systems, and other types of file systems implemented using one or more clusters of processing devices, as well as combinations of multiple such file systems. In one embodiment of the invention, the cluster file system 210 may be a scale-out NAS (network-attached storage) cluster system that is implemented, for example, using Isilon storage platforms, such as storage platforms comprising Isilon platform nodes and associated accelerators in the S-Series, X-Series and NL-Series product lines, commercially available from EMC Corporation of Hopkinton, Mass. In another embodiment, the cluster file system 210 may be implemented using the commercially known Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In the distributed file system 230, the server nodes 240-1, 240-2, ..., 240-N comprise respective data nodes 242-1, 242-2, ..., 242-N, which manage and control persistent storage elements 244-1, 244-2, ..., 244-N, respectively, within the distributed file system 230. The persistent storage elements 244-1, 244-2, ..., 244-N can be implemented using one or more different types of persistent storage devices such as flash storage devices, disk storage devices, etc., as discussed above.

As further shown in FIG. 2A, the server nodes 240-1, 240-2, ..., 240-N comprise respective compute nodes 246-1, 246-2, ..., 246-N, and one of the server nodes, e.g., sever node 240-2, comprises a namenode 248 (a namespace meta data server) which manages the file system namespace and controls access to data files in the distributed file system 230. The data nodes 242-1, 242-2, ..., 242-N, and respective persistent storage elements 244-1, 244-2, ..., 244-N collectively comprise a pool of storage resources 252, which is controlled and managed by the namenode 248 in a centralized manner over the cluster of server nodes 240-1, 240-2, ..., 240-N of the distributed file system 230.

In the embodiment of FIG. 2A, the distributed file system 230 is a Hadoop Distributed File System (HDFS). As is known in the art, HDFS is a block-structured file system in which individual files are divided into blocks of a predetermined size (e.g., 64 MB). The blocks are stored across the cluster of data nodes 242-1, 242-2, ..., 242-N. The Hadoop distributed file system 230 replicates each block across a number of data nodes based on a specified replication factor, which is 3 by default. Since HDFS stores files as a set of large blocks across several data nodes, the files are not part of the standard file system. Instead, HDFS operates in a separate namespace, in which the data blocks that make up files are stored in a local directory that is managed by the data nodes 242-1, 242-2, ..., 242-N, wherein the files are named only with block IDs.

The namenode 248 maintains and manages the namespace metadata for the Hadoop distributed file system 230. The namespace metadata includes file names, permissions, and the locations of each block of each file, and such metadata is stored in a main memory of the server node 240-2 in which the namenode 248 executes. To access a file, a client will access the namenode 248 and retrieve a list of storage node locations for all blocks that make up the file. The storage node locations identify those data nodes 242-1, 242-2, ..., 242-N, which have the blocks stored in respective persistent storage elements 244-1, 244-2, ..., 244-N. The clients will then access the file data directly from the data nodes 242-1, 242-2, ..., 242-N.

In this regard, the HDFS 230 comprises a master/slave architecture, wherein the single namenode 248 is a master server that manages the file system namespace and regulates access to files by clients, and wherein the data nodes 242-1, 242-2, ..., 242-N are slave servers which manage the respective persistent storage elements 244-1, 244-2, ..., 244-N that are connected to the sever nodes on which they execute. The namenode 248 and data nodes 242-1, 242-2, ..., 242-N are software programs that are executed on the corresponding server nodes 240-1, 240-2, ..., 240-N. The namenode 248 performs file system namespace operations such as opening, closing, and renaming files and directories, as well as determining a mapping of data blocks to data nodes 242-1, 242-2, ..., 242-N. The data nodes 242-1, 242-2, ..., 242-N are responsible for processing read and write requests from the clients, and for performing block creation, deletion, and replication operations at the request of the namenode 248.

As noted above, the namenode 248 maintains and manages the file system namespace. Changes to the file system namespace or its properties are recorded by the namenode 248. The namenode 248 utilizes a transaction log referred to as the "EditLog" to persistently record every change that occurs to the file system metadata (e.g., when a new file is created, the namenode 248 inserts a record into the EditLog indicating creation of the new file). The namenode 248 maintains a file in a local host operating system file system to store the EditLog. The entire file system namespace, including the mapping of blocks to files and file system properties, is stored in a file referred to as the FsImage, wherein the FsImage file is stored in the local file system of the namenode 248. The namenode 248 maintains an image of the entire file system namespace and file block map in memory. Each data node 242-1, 242-2, ..., 242-N stores blocks of HDFS data in a separate file in its local file system, and the data nodes have no knowledge of HDFS files. When a data node initializes, it scans through its local file system, generates a list of all HDFS data blocks that correspond to each of the local files, and sends such information in a block report to the namenode 248.

The compute nodes 246-1, 246-2, ..., 246-N comprise software programs that perform computational functions. For example, in a conventional Hadoop system, the compute nodes 246-1, 246-2, ..., 246-N implement a Map/Reduce software framework for writing applications that can process large amounts of data (e.g., multi-terabyte data sets) in parallel on a large cluster of server nodes. A Map/Reduce job usually splits an input data set into independent chunks that are processed by map tasks in a parallel manner. The framework sorts the outputs of the maps, which are then input to reduce tasks. The framework manages scheduling of tasks, monitoring the tasks, and re-executing failed tasks. As depicted in FIG. 2A, the compute nodes 246-1, 246-2, . . . , 246-N and respective data nodes 242-1, 242-2, . . . , 242-N typically execute on the same server nodes 240-1, 240-2, . . . , 240-N, respectively. This configuration allows the framework to effectively schedule tasks on the sever nodes where data is stored. The Map/Reduce framework may comprise a single master job tracker method and one slave task tracker method per cluster node. The master is responsible for scheduling component tasks of a given job on the slave nodes, monitoring them, and re-executing failed tasks. The slaves execute tasks as directed by the master. A Hadoop client will submit a job and the job parameters to the master job tracker, which then assumes responsibility for distributing the software/configuration to the slaves, scheduling tasks and monitoring them, and providing status and diagnostic information to the client.

FIG. 2A illustrates a state in which the data storage system 200 comprises two disparate file systems 210 and 230 having separate pools of storage resources 250 and 252, respectively, which are independently managed by the respective file systems 210 and 230. In contrast, FIG. 2B illustrates a data storage system 200' that is created by the cluster file system 210 adopting the namespace of the distributed file system 230 and assuming control of the storage nodes of the distributed file system 230. In particular, as shown in FIG. 2B, the cluster file system 210 comprises an acquired namespace metadata server 226 that is configured to execute on one or more server nodes 220-1, 220-2, . . . , 220-M of the cluster file system 210.

In the embodiment of FIG. 2B, the cluster file system 210 acquires the namespace of the distributed file system 230, and uses the acquired namespace metadata server 226 to manage the acquired namespace of the distributed file system 230. Moreover, the cluster file system 210 uses the acquired namespace metadata server 226 to directly communicate with and control access to the plurality of data nodes 242-1, 242-2, . . . , 242-N of the distributed file system 230. As shown in FIG. 2B, the namenode 248 of the distributed file system 230 no longer exists, and its functionality is entirely replaced by the acquired namespace metadata server 226 in a manner that is transparent to clients of the distributed file system 230.

Moreover, the cluster file system 210 adopts the storage resources of the distributed file system 230 such that an extended pool of storage resources 254 is formed (as shown in FIG. 2B), which includes the original storage nodes 222-1, 222-2, . . . , 222-M and corresponding persistent storage elements 224-1, 224-2, . . . , 224-M of the cluster file system 210, as well as adopted storage resources 230' comprising the data nodes 242-1, 242-2, . . . , 242-N and the associated persistent storage elements 244-1, 244-2, . . . , 244-N of the distributed file system 230. It is to be understood that the distributed file system 230 in FIG. 2A is adopted by the clustered file system 210 such that in FIG. 2B, the distributed file system 230 ceases to exist as a separate independent system. Rather, the acquired namespace metadata server 226 that executes on one or more server nodes of the cluster file system 210 assumes control of the namespace and storage resources acquired from the distributed file system 230.

Figure 3:
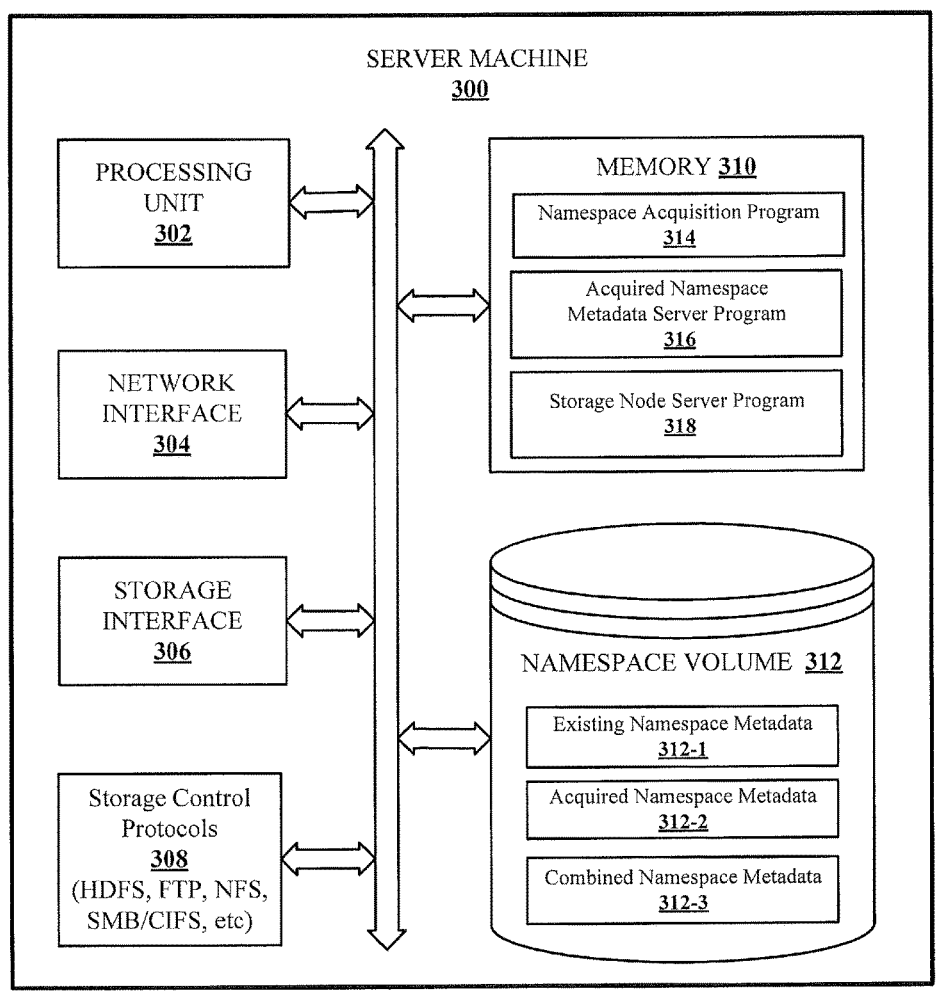
FIG. 3 schematically illustrates a processing platform that may be utilized to implement at least a portion of the file systems shown in FIGS. 1 and 2B, according to an embodiment of the invention.

FIG. 3 schematically illustrates a processing platform that may be utilized to implement at least a portion of the file systems shown in FIGS. 1 and 2B, according to an embodiment of the invention. In particular, FIG. 3 illustrates an architecture of a server 300 that can be used to implement one or more of the servers 220-1, 220-2, . . . , 220-M in FIG.

2B or the server 120 of FIG. 1. As shown in FIG. 3, the server 300 comprises a processing unit 302, network interface circuitry 304, storage interface circuitry 306, a storage control protocol module 308, system memory 310, and a namespace volume database 312. The processing unit 302 comprises one or more of a computer processor, a microprocessor, a microcontroller, an application-specific integrated circuit (ASIC), a field programmable gate array (FPGA) or other type of processing circuitry, as well as portions or combinations of such circuitry elements. The network interface circuitry 304 enables the server 300 to interface and communicate with a network and other system components. The network interface circuitry 304 may comprise conventional transceivers of a type well known in the art.

The storage interface circuitry 306 enables the server 300 to interface with storage devices and control the storage of data within persistent storage elements of the associated file system. The storage interface circuitry 306 utilizes file system metadata and/or namespace metadata stored in the namespace volume database 312 to manage a file system for one or more namespace volumes. In the embodiment of FIG. 3, the namespace volume database 312 comprises various namespace metadata including existing namespace metadata 312-1, acquired namespace metadata 312-2, and combined namespace metadata 312-3. The existing namespace metadata 312-1 is namespace metadata representing one or more storage volumes of an existing (adopting) file system that adopts/acquires the namespace and storage resources of another (adopted) file system. The acquired namespace metadata 312-2 is namespace metadata that is acquired from the adopted file system. The combined namespace metadata 312-3 is generated by merging/aggregating the existing namespace metadata 312-1 and the acquired namespace metadata 312-2. The various types of namespace metadata 312-1, 312-2, and 312-3 are used to perform various storage access and control functions, as explained in further detail below with reference to FIG. 4.

Moreover, the storage interface circuitry 306 utilizes one or more storage control protocols 308 to read, write and otherwise access data in persistent storage devices such as flash memory devices, DAS (direct attached storage) devices, NAS (network-attached storage) devices, etc., depending on the storage system utilized. For example, the storage control protocols may include known protocols such as NFS (network file system), HDFS, FTP (file transfer protocol), and/or SMB (Server Message Block)/CIFS (Common Internet File System) protocols, for example.

Furthermore, the system memory 310 comprises electronic memory such as random access memory (RAM), read-only memory (ROM), or other types of memory, in any combination. The system memory 310 stores one more software programs having instructions that are read and processed by the processing unit 302 to implement various functions associated with the given computing environment in which the server 300 operates. For example, as shown in FIG. 3 by way of example, the system memory 310 stores a namespace acquisition program 314, an acquired namespace metadata server program 316, and a storage node server program 318. The namespace acquisition program 314 comprises executable program instructions that are used to acquire namespace metadata of a file system being adopted and to otherwise process/configure/generate other types of namespace metadata to support file system management functions as discussed herein. Moreover, the acquired namespace metadata server program 316 comprises executable program instructions that are used to generate, configure, and otherwise implement an acquired namespace metadata server (e.g., elements 126 and 226 shown in FIGS. 1 and 2B). The storage node server program 318 comprises executable program instructions that are used to implement a storage node service (e.g., element 122 in FIG. 1 or elements 222-1, 222-2, . . . , 222-M in FIG. 2B) to control and manage access to persistent storage elements.

The system memory 310 and other persistent storage elements described herein having program code tangibly embodied thereon are examples of what is more generally referred to herein as "processor-readable storage media" that store executed program code of one or more software programs. Other examples of processor-readable storage media embodying program code include, for example, optical or magnetic storage disks. Articles of manufacture comprising such processor-readable storage media are considered embodiments of the invention, An article of manufacture may comprise, for example, a storage device such as a storage disk, a storage array or an integrated circuit containing memory. The term "article of manufacture" as used herein should be understood to exclude transitory, propagating signals.

It is to be understood that the other servers 140-1, 140-2, . . . , 140-N in FIG. 1 and servers 240-1, 240-2, . . . , 240-N in FIG. 2B, for example, may be configured in a manner that is the same or similar to the server architecture depicted in FIG. 3. The constituent components and modules of a given server can vary depending on whether the given server executes a data storage service, a namespace metadata service or both. The computing platform 300 shown in FIG. 3 may comprise additional known components such as batch processing systems, parallel processing systems, physical machines, virtual machines, virtual switches, storage volumes, logical units, etc. Again, the particular computing platform shown in FIG. 3 is presented by way of example only, and the computing platform 300 may include additional or alternative processing platforms, as well as numerous distinct processing platforms in any combination.

For example, in another embodiment of the invention, a cloud computing system can be used to implement at least a portion of one or more of the file systems or storage systems depicted in FIGS. 1 and 2B, for example. In a cloud computing embodiment, a processing platform may comprise a plurality of virtual machines (VMs) implemented using a hypervisor that runs on physical infrastructure. The cloud computing system would further comprise sets of applications running on respective ones of the virtual machines under the control of the hypervisor. The cloud computing system may encompass the entire file systems shown in FIGS. 1 and 2B, for example, or portions thereof. In other embodiments, multiple hypervisors can be implemented, wherein each hypervisor provides a set of virtual machines using at least one underlying physical machine.

An example of a commercially available hypervisor platform that may be implemented in one or more embodiments of the invention is the VMware® vSphere™ which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of file systems shown in FIGS. 1 and 2B.

Figure 4:
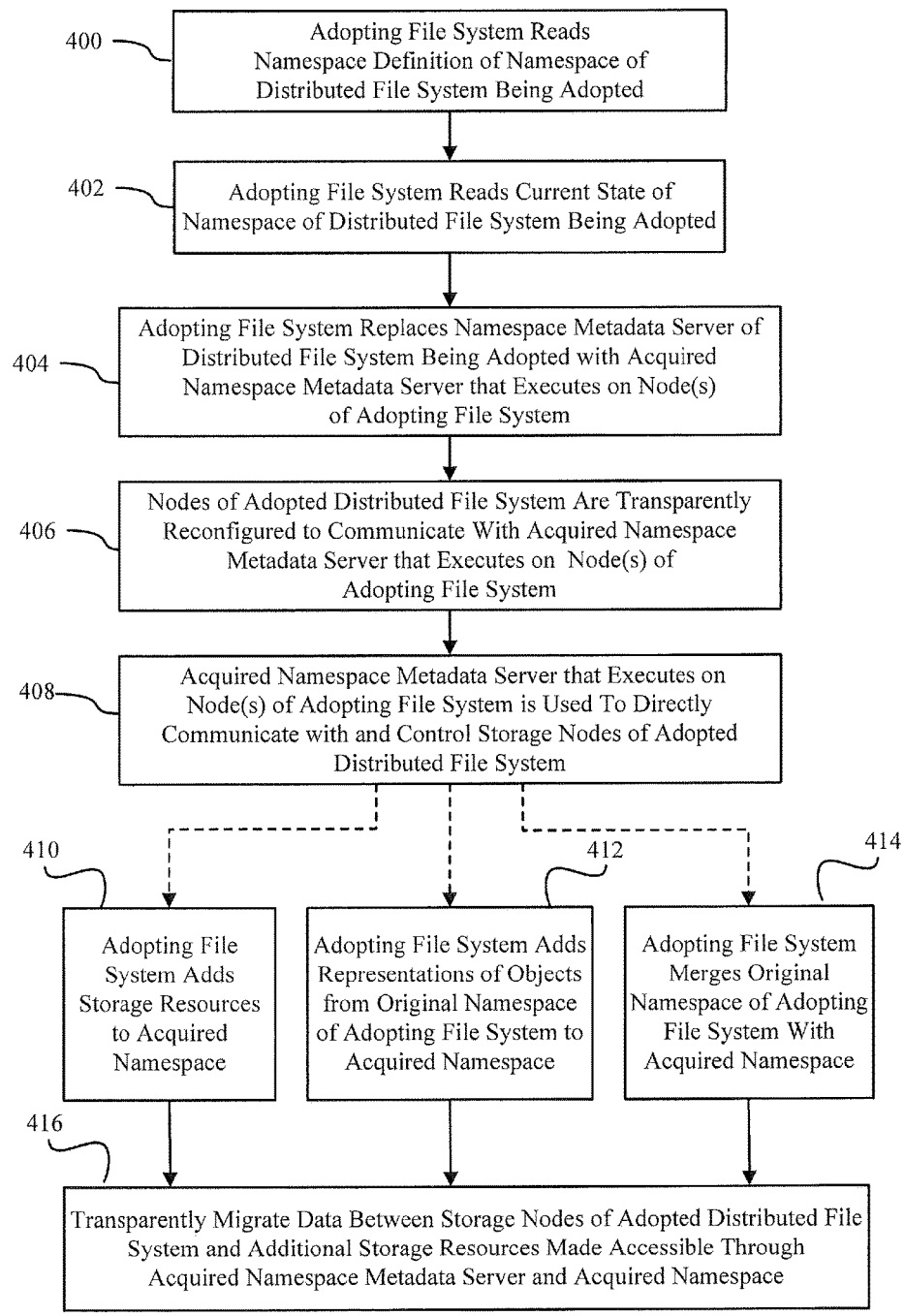
FIG. 4 is a flow diagram of a process that is implemented by a file system to acquire and assume control over a namespace of another file system, according to an embodiment of the invention.

FIG. 4 is a flow diagram of a process that is implemented by a file system to acquire and assume control over a namespace of another file system, according to an embodiment of the invention. In particular, FIG. 4 illustrates a process flow of a method that is implemented by a file system to adopt and assume control of a distributed file system, according to an embodiment of the invention. For purposes of illustration, the process flow of FIG. 4 will be discussed with reference to the embodiments shown in FIGS. 2A, 2B and 3. In the following example, a first file system adopts a distributed file system. The first file system, which is referred to as an "adopting file system," can be a single file server system, a distributed file system, or a cluster file system, for example.

Initially, the adopting file system will perform steps to assume control of a namespace of the distributed file system being adopted. In particular, referring to FIG. 4, the adopting file system reads a namespace definition of the namespace of the distributed file system being adopted (block 400), and then reads a current state of the namespace of the distributed file system being adopted (block 402). In an HDFS implementation, for example, the current state of the namespace comprises all the metadata information that exists in the FsImage file, such as the namespace and mapping information, and information contained in the edit and transactional log files. These steps enable the adopting file system to acquire the namespace structure and corresponding namespace metadata of the distributed file system being adopted.

Next, the adopting file system replaces the namespace metadata server of the distributed file system being adopted with an acquired namespace metadata server that executes on one or more server nodes of the adopting file system (block 404). With this process, the metadata server of the adopted distributed file system ceases to exist, and the acquired namespace of the adopted distributed file system is under the control of the acquired namespace metadata server that executes on the server node(s) of the adopting file system. By way of example, with the Hadoop distributed file system 230 shown in FIG. 2A, the functionality of the namenode server 248 is taken over by the cluster file system 210 and the namenode server 248 ceases to execute on the server node 240-2 of the Hadoop distributed file system 230. Further, as shown in FIG. 2B, the acquired namespace metadata server 226 that executes on the server nodes 220-1, 220-2, . . . , 220-M of the cluster file system 210 assumes control over the adopted storage resources 230' (e.g., the data nodes 242-1, 242-2, . . . , 242-N and associated persistent storage elements 244-1, 244-2, . . . , 244-N) of the Hadoop distributed file system 230.

It is to be understood that the acquisition of the namespace of the adopted distributed file system and the replacement of the metadata server of the adopted distributed file system is performed in a manner that is transparent to clients of the adopted distributed file system and without any loss or movement of data of the adopted storage resources. When the namespace acquisition process is complete, the data nodes (or more generally, storage nodes) of the adopted distributed file system are transparently reconfigured to communicate with the acquired namespace metadata server that executes on the server node(s) of the adopting file system (block 406). The acquired namespace metadata server is used to directly communicate with and control the storage nodes of the adopted file system (block 408).

At this point, the acquired namespace (i.e., the namespace acquired from the adopted distributed file system) remains unchanged and under control of the acquired namespace metadata sever executing on the server node(s) of the adopting file system. In addition, the original namespace of the adopting file system and the acquired namespace of the adopted distributed file system remain separate. As such, after the distributed file system is adopted, the clients of the original distributed file system can access data stored in the adopted storage nodes (or data nodes) through the acquired namespace metadata server that executes on the server node(s) of the adopting file system. Moreover, at this point, the clients of the original distributed file system do not have access to the storage resources or stored data of the adopting file system. However, the adopting file system can extend the acquired namespace in a plurality of ways to enable access to the storage resources and/or stored data of the adopting file system.

For example, in one embodiment of the invention, the adopting file system can add the storage resources (e.g., storage nodes and associated persistent storage elements) to the acquired namespace (block 410). In this embodiment, the original namespace of the adopting file system and the acquired namespace of the adopted distributed file system remain separate, but the adopting file system adds its storage nodes to the acquired namespace so that clients of original distributed file system can access the existing storage nodes of the adopting file system, as well as access the storage nodes of the adopted distributed file system. For example, as shown in FIG. 2B, the pool of storage resources 254 under control of the acquired namespace metadata server 226 is extended to include the storage resources of the cluster file system 210 (adopting file system) and the adopted storage resources 230' of the original distributed file system. However, with this embodiment, the clients of the original distributed file system would not be able to access data of the adopting file system, and clients of the adopting file system would not be able to access data of the adopted distributed file system.

In another embodiment, the adopting file system can add a representation of objects from the existing namespace of the adopting file system to the acquired namespace (block 412). In this embodiment, the clients of the original distributed file system can utilize the storage nodes of the adopting file system, and access stored data of the original distributed file system that is stored on the adopted storage resources, as well as access stored data of the adopting file system that is stored on the storage resources of the adopting file system. However, the original namespace of the adopting file system does not include data of the adopted distributed file system so that clients of the adopting file system cannot access data stored on the adopted storage nodes of the adopted distributed file system.

In yet another embodiment of the invention, the adopting file system can merge or otherwise combine the existing namespace of the adopting file system with the acquired namespace of the adopted distributed file system (block 414). In this embodiment, the clients of the original distributed file system can utilize the storage nodes of the adopting file system and access data of the adopting file system, and the clients (e.g., NFS, FTP, SMB/CIFS clients) of the adopting file system and utilize the adopted storage nodes of the adopted distributed file system and well as access data of the adopted distributed file system. The acquired namespace of the adopted distributed file system and the existing namespace of the adopting file system can be merged or combined using one or more of various techniques that are known to those of ordinary skill in the art.

Irrespective of the manner in which the acquired namespace is extended or otherwise modified in blocks 410, 412, or 414, the adopting file system can transparently migrate data between storage nodes of the adopted distributed file system and the additional storage resources of the adopting file system, which are made accessible through the acquired namespace metadata server and namespace of the adopted distributed file system (block 416). For example, data objects can be moved between the different data storage resources of the adopting file system and the adopted distributed file system based on access and/or policy to optimize capacity and/or performance utilization. By way of specific example, to optimize performance, when the acquired namespace metadata server sees that certain data is frequently accessed by compute nodes on one or more server nodes, a copy of that data can be replicated on the one or more server nodes to place the data closer to the compute nodes that operate on the data. Moreover data can be migrated to facilitate tech refresh operations wherein when a set of nodes are to be decommissioned, the acquired namespace metadata server can cause evacuation of data from the nodes to be decommissioned, and replicated in other storage nodes.

It is to be emphasized that the above-described embodiments of the invention are presented for purposes of illustration only. Many variations and other alternative embodiments may be used. For example, the disclosed techniques are applicable to a wide variety of other types and arrangements of cluster file systems and associated clients, servers and other processing devices. In addition, the particular configurations of system and device elements shown in FIGS. 1, 2A, 2B and 3 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computing system, comprising:
a first file system comprising one or more storage nodes for storing data, and a first namespace metadata server configured to control and manage a first namespace of the first file system to access the data stored in the one or more storage nodes of the first file system; and
a distributed file system, which is separate from the first file system, the distributed file system comprising a plurality of storage nodes for storing data, and a second namespace metadata server configured to control and manage a second namespace of the distributed file system to access the data stored in the plurality of storage nodes of the distributed file system;
wherein the first file system further comprises a third namespace metadata server, which executes on one or more nodes of the first file system, and which is configured to control and manage the second namespace of the distributed file system by virtue of a namespace acquisition process in which the first file system acquires and assumes control of the second namespace of the distributed file system;
wherein in conjunction with the acquisition of the second namespace of the distributed file system by the first file system, the first namespace of the first file system remains logically different from the second namespace of the distributed file system such that the first namespace cannot be utilized to access data stored in the plurality of storage nodes of the distributed file system, but wherein the first file system utilizes the third namespace metadata server and the acquired second namespace of the distributed file system to directly communicate with the plurality of storage nodes of the distributed file system and control data access operations to access data stored in the plurality of storage nodes of the distributed file system;

wherein in conjunction with the acquisition of the second namespace of the distributed file system by the first file system, the third namespace metadata server of the first file system implements a functionality of the second namespace metadata server of the distributed file system, and the second namespace metadata server of the distributed file system ceases to execute on the distributed file system;

wherein in conjunction with the acquisition of the second namespace of the distributed file system by the first file system, the acquired second namespace of the distributed file system remains unchanged and under control of the third namespace metadata server executing on the one or more nodes of the first file system; and wherein in conjunction with the acquisition of the second namespace of the distributed file system by the first file system, the first namespace of the first file system and the acquired second namespace of the distributed file system remain separate.

2. The computing system of claim 1, wherein the first file system comprises one of a single file server system, a distributed file system, and a clustered file system.

3. The computing system of claim 1, wherein the distributed file system comprises a HADOOP distributed file system.

4. The computing system of claim 1, wherein the first file system configures the third namespace metadata server to add storage resources of the first file system to the acquired second namespace of the distributed file system, subsequent to the acquisition of the second namespace of the distributed file system by the first file system.

5. The computing system of claim 1, wherein the first file system configures the third namespace metadata server to add a representation of one or more objects from the first namespace of the first file system to the acquired second namespace of the distributed file system, subsequent to the acquisition of the second namespace of the distributed file system by the first file system.

6. The computing system of claim 1, wherein the first file system configures the third namespace metadata server to merge the first namespace of the first file system with the acquired second namespace of the distributed file system to generate a merged namespace, subsequent to the acquisition of the second namespace of the distributed file system by the first file system.

7. The computing system of claim 1, wherein the first file system is configured to utilize the third namespace metadata server and the acquired second namespace of the distributed file system to transparently migrate data between the storage nodes of the distributed file system and storage resources of the first file system, subsequent to the acquisition of the second namespace of the distributed file system by the first file system.

8. An apparatus comprising:
a server node of a first file system, the first file system comprising one or more storage nodes for storing data, and a first namespace metadata server configured to control and manage a first namespace of the first file system, wherein the server node comprises:
a processor; and
a memory coupled to the processor, wherein the memory comprises program instructions that are executed by the processor to implement:
execution of a namespace acquisition module that is configured to acquire a second namespace of a distributed file system, wherein the distributed file system is separate from the first file system, wherein the distributed file system comprises a plurality of storage nodes for storing data, and a second namespace metadata server configured to control and manage the second namespace of the distributed file system;
execution of the first namespace metadata server to control and manage the first namespace of the first file system to access the data stored in the one or more storage nodes of the first file system; and
execution of a third namespace metadata server to control and manage the acquired second namespace of the distributed file system;

wherein in conjunction with the acquisition of the second namespace of the distributed file system by the first file system, the first namespace of the first file system remains logically different from the second namespace of the distributed file system such that the first namespace cannot be utilized to access data stored in the plurality of storage nodes of the distributed file system, but wherein the first file system utilizes the third namespace metadata server and the acquired second namespace of the distributed file system to directly communicate with the plurality of storage nodes of the distributed file system and control data access operations to access data stored in the plurality of storage nodes of the distributed file system;

wherein in conjunction with the acquisition of the second namespace of the distributed file system by the first file system, the third namespace metadata server of the first file system implements a functionality of the second namespace metadata server of the distributed file system and the second namespace metadata server of the distributed file system ceases to execute on the distributed file system;

wherein in conjunction with the acquisition of the second namespace of the distributed file system by the first file system, the acquired second namespace of the distributed file system remains unchanged and under control of the third namespace metadata server executing on the one or more nodes of the first file system; and wherein in conjunction with the acquisition of the second namespace of the distributed file system by the first file system, the first namespace of the first file system and the acquired second namespace of the distributed file system remain separate.

9. The apparatus of claim 8, wherein the third namespace metadata server of the first file system is further configured to add storage resources of the first file system to the acquired second namespace of the distributed file system, subsequent to the acquisition of the second namespace of the distributed file system by the first file system.

10. The apparatus of claim 8, wherein the third namespace metadata server of the first file system is further configured to add a representation of one or more objects from the first namespace of the first file system to the acquired second namespace of the distributed file system, subsequent to the acquisition of the second namespace of the distributed file system by the first file system.

11. The apparatus of claim 8, wherein the third namespace metadata server of the first file system is further configured to merge the first namespace of the first file system with the acquired second namespace of the distributed file system to generate a merged namespace, subsequent to the acquisition of the second namespace of the distributed file system by the first file system.

12. The apparatus of claim 8, wherein the third namespace metadata server of the first file system is further configured to transparently migrate data between storage nodes of the distributed file system and storage resources of the first file system, subsequent to the acquisition of the second namespace of the distributed file system by the first file system.

13. A method, comprising:

utilizing, by a first file system, a first namespace metadata server that is configured to control and manage a first namespace of the first file system to access data stored in one or more storage nodes of the first file system;

acquiring, by the first file system, a second namespace of a distributed file system being acquired by the first file system, wherein the distributed file system comprises a second namespace metadata server configured to control and manage the second namespace of the distributed file system to access data stored in a plurality of storage nodes of the distributed file system; and utilizing, by the first file system, a third namespace metadata server to control and manage the acquired second namespace of the distributed file system;

wherein in conjunction with the acquisition of the second namespace of the distributed file system by the first file system, the first namespace of the first file system remains logically different from the second namespace of the distributed file system such that the first namespace cannot be utilized to access data stored in the plurality of storage nodes of the distributed file system, but wherein the first file system utilizes the third namespace metadata server and the acquired second namespace of the distributed file system to directly communicate with the plurality of storage nodes of the distributed file system and control data access operations to access data stored in the plurality of storage nodes of the distributed file system;

wherein in conjunction with the acquisition of the second namespace of the distributed file system by the first file system, the third namespace metadata server of the first file system implements a functionality of the second namespace metadata server of the distributed file system and the second namespace metadata server of the distributed file system ceases to execute on the distributed file system;

wherein in conjunction with the acquisition of the second namespace of the distributed file system by the first file system, the acquired second namespace of the distributed file system remains unchanged and under control of the third namespace metadata server executing on the one or more nodes of the first file system; and wherein in conjunction with the acquisition of the second namespace of the distributed file system by the first file system, the first namespace of the first file system and the acquired second namespace of the distributed file system remain separate.

14. The method of claim 13, wherein acquiring the second namespace of the distributed file system comprises:

reading a namespace definition of the second namespace of the distributed file system; and reading a current state of the second namespace of the distributed file system.

15. The method of claim 13, further comprising adding storage resources of the first file system to the acquired second namespace of the distributed file system, subsequent to the acquisition of the second namespace of the distributed file system by the first file system.

16. The method of claim 13, further comprising adding a representation of one or more objects from the first namespace of the first file system to the acquired second namespace of the distributed file system, subsequent to the acquisition of the second namespace of the distributed file system by the first file system.

17. The method of claim 13, further comprising merging the first namespace of the first file system with the acquired second namespace of the distributed file system to generate a merged namespace, subsequent to the acquisition of the second namespace of the distributed file system by the first file system.

18. The method of claim 13, further comprising transparently migrating data between storage nodes of the distributed file system and storage resources of the first file system, subsequent to the acquisition of the second namespace of the distributed file system by the first file system.

19. The method of claim 13, wherein the first file system comprises one of a single file server system, a distributed file system, and a clustered file system.

20. An article of manufacture comprising a processor-readable storage medium having encoded therein executable code of one or more software programs, wherein the one or more software programs when executed on one or more processing platforms cause the method of claim 13 to be performed.

* * * * *